United States Patent [19]
Carey et al.

[11] Patent Number: 5,758,102
[45] Date of Patent: May 26, 1998

[54] SOFT SWITCHING CIRCUIT FOR USE ON BACKPLANE

[75] Inventors: John Joseph Carey; Raymond Mathew Clemo, both of Raleigh; Carleton David Driscoll, Cary, all of N.C.

[73] Assignee: International Business Machines Corporation, Armonk, N.Y.

[21] Appl. No.: 585,331

[22] Filed: Jan. 11, 1996

[51] Int. Cl.$^6$ ..................................... H01J 13/00
[52] U.S. Cl. ................. 395/283; 395/281; 395/282; 395/750.07; 395/878
[58] Field of Search .................. 395/750, 281, 395/282, 283, 305, 298, 309, 311, 822, 835, 836, 838, 882, 883; 326/56, 57, 83; 364/707; 361/58, 58.2

[56] References Cited

U.S. PATENT DOCUMENTS

| | | | |
|---|---|---|---|
| 5,268,592 | 12/1993 | Bellamy et al. | 307/43 |
| 5,272,584 | 12/1993 | Austruy et al. | 361/58 |
| 5,317,697 | 5/1994 | Husak et al. | 395/282 |
| 5,530,302 | 6/1996 | Hamre et al. | 307/147 |
| 5,572,395 | 11/1996 | Rasums et al. | 361/58 |
| 5,604,873 | 2/1997 | Fite et al. | 395/283 |

*Primary Examiner*—Jack B. Harvey
*Assistant Examiner*—Raymond N. Phan
*Attorney, Agent, or Firm*—Steven B. Phillips; John B. Frisone

[57] ABSTRACT

A hot-plugging circuit associated with a backplane or motherboard for controlling the rate of application of voltage and current to a non-operating printed-circuit card in the process of being inserted into a backplane connector in a system including other already-operating printed-circuit cards. Each backplane connector has connector contacts of two different lengths. An isolation diode at each connector is connected to two of the longer contacts of the connector and is forward biased by a non-operating printed-circuit card being inserted into that connector. The forward-biased isolation diode triggers a card insertion circuit to recognize that a non-operating printed-circuit card is in the process of being inserted. The card insertion circuit triggers a voltage and current control circuit to ramp up the voltage and current furnished to the non-operating printed circuit. The card insertion circuit also triggers a timeout circuit which, in the case of a printed-circuit card which draws a high current, terminates the operation of the control circuit after a time period during which the printed-circuit board should normally have been inserted, if the card is angled too much upon insertion and can not be fully inserted. Completion of insertion of the printed-circuit card makes electrical connection to shorter contacts which carry the normal voltage supply to the printed-circuit card and disables the control circuit.

5 Claims, 4 Drawing Sheets

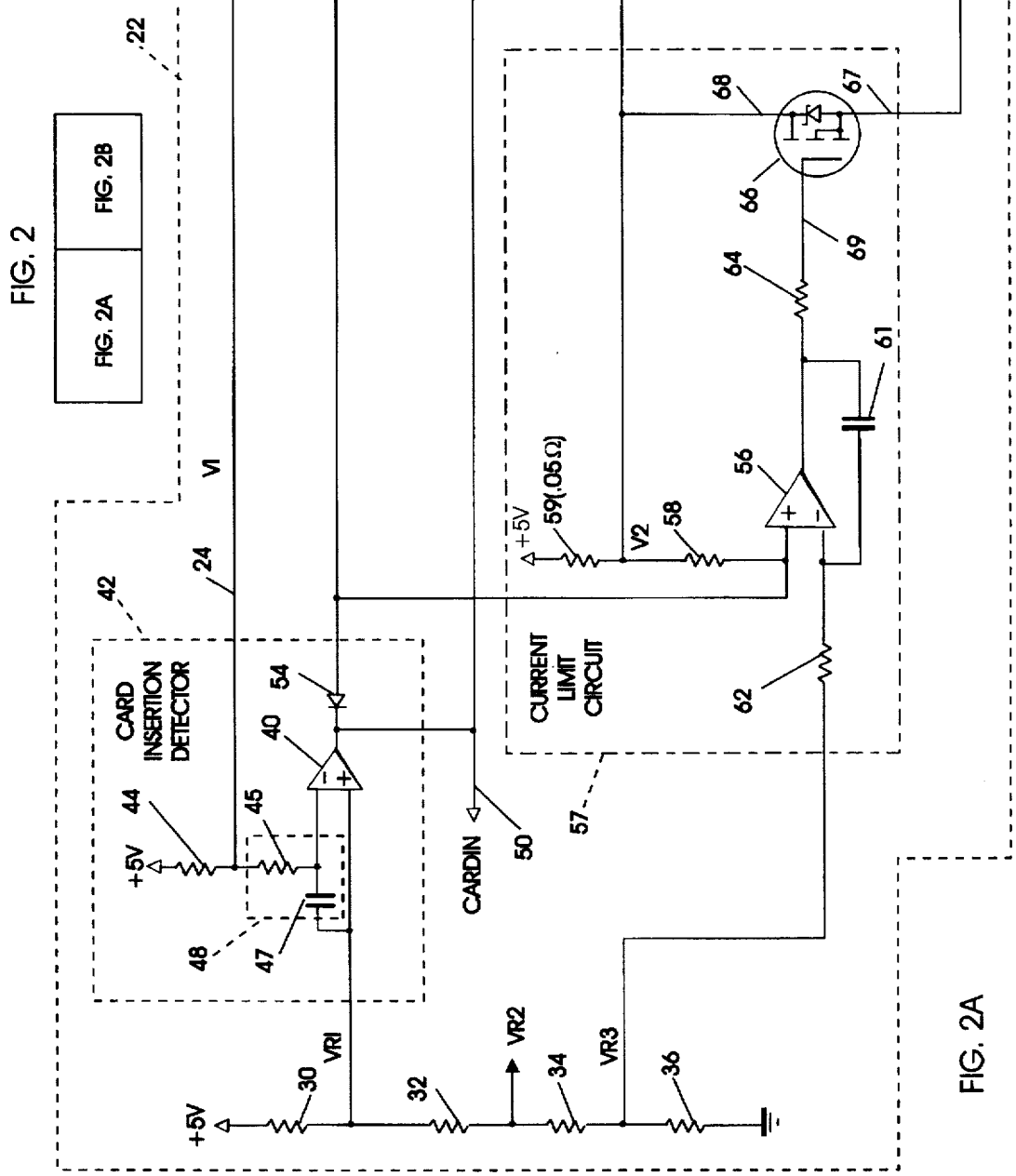

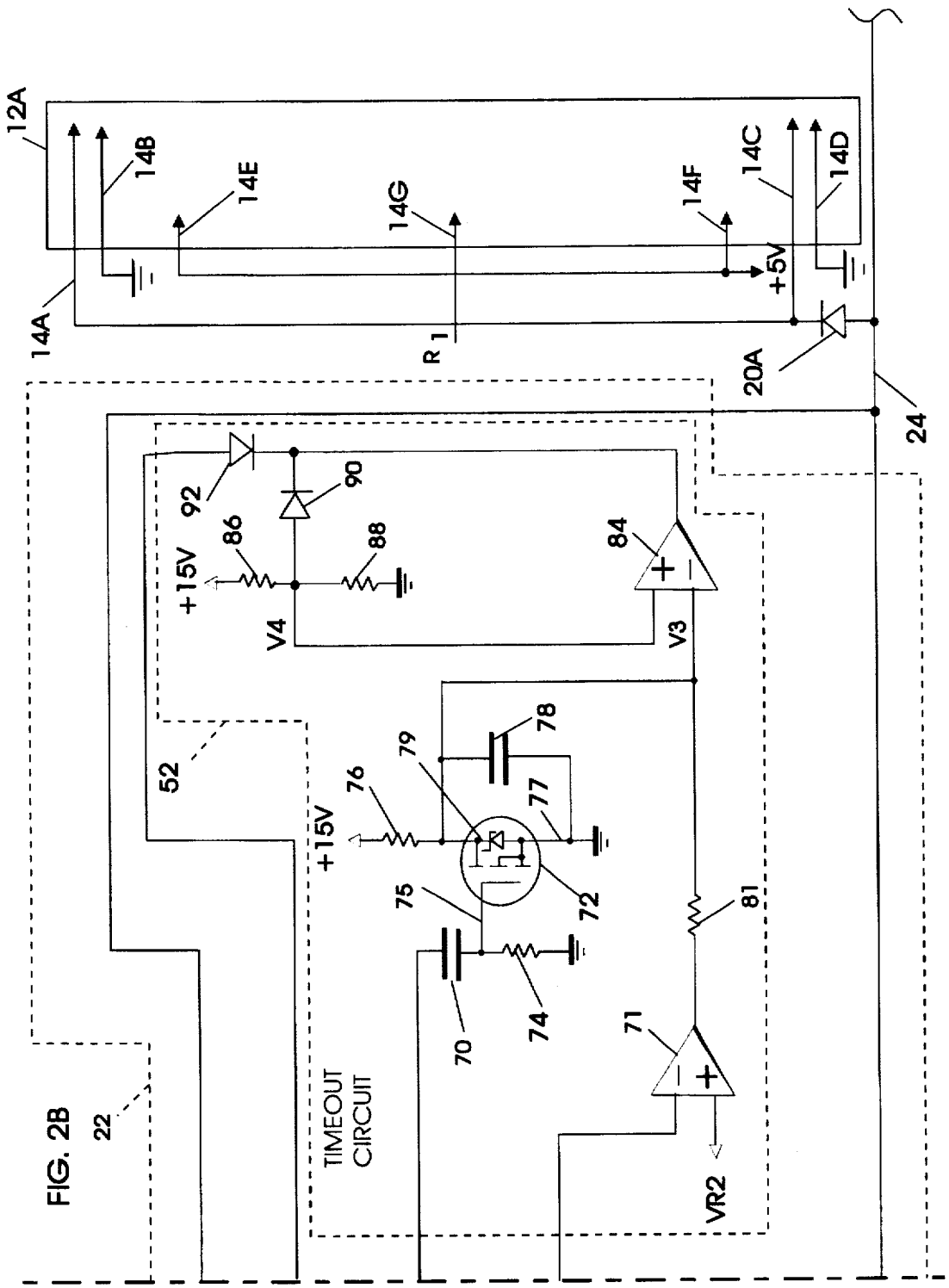

SOFT SWITCHING CIRCUIT FOR USE ON BACKPLANE

FIELD OF THE INVENTION

The present invention relates to controlling the voltage and current initially supplied to a printed-circuit card, in a gentle or gradual manner, as the printed-circuit card is inserted into a connector on a backplane or in a common interconnect facility. More particularly, the present invention relates to a single voltage and current controlling circuit common to any printed-circuit card that is in the process of being inserted into a connector on the backplane, while avoiding undesired interaction between a printed-circuit card in the process of being inserted and the operation of other circuits within an operating electronic system.

BACKGROUND OF THE INVENTION

There is almost an unlimited variety of situations in which it is desirable to plug a printed-circuit card into a larger electronic circuit system without first turning off the power to the larger system. The most common situation is some form of stored-program controller or computer such as a telephone switching system, a main-frame computer, or a LAN file server, all of which must often remain in operation twenty-four hours a day, every day. However, many printed-circuit cards can either be damaged by an uncontrolled application of electrical voltage; can emit spurious signals that could disrupt the larger electronic system; can draw such high surges of supply current, such as to charge various on-board capacitances, that the supply voltages can experience sudden disruptions, often with unpredictable consequences.

Such situations and problems are not new, and quite a few "soft-switch" or "hot-plugging" circuits have been developed in an effort to control the sudden application of supply voltage and current to a printed-circuit card as it is plugged into a larger and already operating electronic circuit system. U.S. Pat. No. 5,272,584, granted on Dec. 21, 1993, to Austruy, et al., discloses or references several examples of such soft-switch circuits.

One group of soft-switch circuits uses plug connector contacts of different lengths so that, when inserting or extracting a printed-circuit card, some connections are made or broken before others. In one type of such a circuit, a first-to-make-and-last-to-break contact applies voltage to the printed-circuit card through a resistive-capacitive (RC) circuit or may use active electronic components controlled by an RC circuit. This causes a more controlled and gradual rise of the voltage applied to the printed-circuit card's main circuitry.

A more complex type of soft-switch circuit for use with different length contacts uses active components to control and ramp the rise of the voltage applied and to limit the magnitude of current supplied to the printed-circuit card. An example of a hot-plugging circuit with active components is disclosed in U.S. Pat. No. 4,245,270 granted to Busby on Jan. 15, 1981.

Volume 37, No. 6B—Jun., 1994 page 367 of the IBM Technical Disclosure Bulletin discloses a Hot Plugging scheme for a power voltage converter. When first plugged in, an RC time constant slowly turns ON a series-connected Field-Effect Transistor (FET) until enough voltage is available through the series FET to start the power oscillator FET of the power voltage converter. The power oscillator FET output then also drives a charge pump to continue control of the turn-on rate of the series FET and serves to keep it on.

Sophisticated soft-switch circuits with active components, including integrated circuits, are not cheap. Therefore, providing a separate soft-switch circuit for each plug-in printed-circuit or adapter card can be costly of both components and even more costly of limited and valuable area on the plug-in adapter or printed-circuit card, itself.

Many soft switches are provided on the load side of the plug or connector. That is, they are mounted on the plug-in printed-circuit card. An example of a soft-switch circuit that is designed to be placed on the source side of the plug rather than on the load side is shown in the IBM Technical Disclosure Bulletin Volume 34, No. 4A—Sep. 1991 page 9, which discloses a FET as the voltage and current control switching element of such a circuit.

When the plug is one of the many connectors of a backplane buss, a large number of operating printed-circuit cards may be operating simultaneously on the backplane buss when one additional non-operative printed-circuit card is to be inserted. It would save money and valuable space on the individual printed-circuit cards if only one voltage and current limited circuit could be placed on the backplane to serve any and all plugs or connectors on the backplane which might be in the process of receiving a non-operative printed-circuit card. Also, premature functioning of the printed-circuit card being inserted is to be avoided. Additionally, unwanted interaction is to be avoided between the operating printed-circuit cards and the printed-circuit card that is in the process of being inserted into a plug or connector on the backplane buss.

When a high-current printed-circuit card circuit is provided with a soft switch, it may become wedged and jammed upon insertion and draws so much current for an extended time that it might burn out one or more components in the soft-switch circuit. It is often undesirable to design a soft switch circuit for what amounts to continuous-duty service.

SUMMARY OF THE INVENTION

It is an object of the present invention to turn ON the voltage and current to any plug-in printed-circuit card in a controlled manner in connection with insertion of the printed-circuit card into a connector of a backplane buss which simultaneously contains other printed-circuit cards that are in operation at the time.

In connection with one aspect of the present invention, for controlling the transition of voltage and current supplied to a printed-circuit card as it is being inserted into a connector on a backplane, a controlling circuit associated with the backplane recognizes that a non-operating printed-circuit card is being inserted into one of the connectors on the backplane. The controlling circuit limits the voltage applied to the printed-circuit card as it is being inserted, and resets the circuitry of the printed-circuit card to a predetermined circuit state.

In connection with a hot-plugging circuit for use with a backplane buss for controlling the voltage supplied to a non-operating printed-circuit card as it is being inserted into a connector on the backplane, coupling only a non-operating printed-circuit card to a voltage and current limiting circuit during the insertion operation and decoupling the voltage and current limiting circuit from the printed-circuit card once the insertion operation has been completed.

In another aspect of the present invention, the transition of the current and voltage supplied to a non-operating printed-circuit card is controlled by a field-effect transistor device serving all of the connectors on a backplane. The field-effect transistor device is only enabled during the process of inserting a non-operating printed-circuit card into one of the connectors on the backplane. Only a non-operating printed-circuit card is coupled to the field-effect transistor device and is decoupled from the field-effect transistor device as soon as the printed-circuit switch has completed the insertion process.

It is another object of the present invention to detect the insertion of a non-operating printed-circuit card into a connector of a backplane and to reset the circuitry of the printed circuit card to a predetermined circuit state as soon as the insertion process has been detected. As an alternative, the reset operation can be extended by a predetermined time period after the completion of the insertion process has been detected.

BRIEF DESCRIPTION OF THE DRAWINGS

A more complete understanding of the present invention will be had from the following detailed description when considered in conjunction with the accompanying drawings, wherein the same reference numbers refer to the same or corresponding parts shown throughout the several figures, in which:

FIG. 2 illustrates how FIGS. 2A and 2B are arranged;

FIGS. 2A and 2B show the circuitry for controlling the application of voltage and current to a non-operating printed-circuit card inserted into a connector of the backplane of an operating electronic system.

DETAILED DESCRIPTION OF THE BEST MODE AND INDUSTRIAL APPLICABILITY

Figure 1:
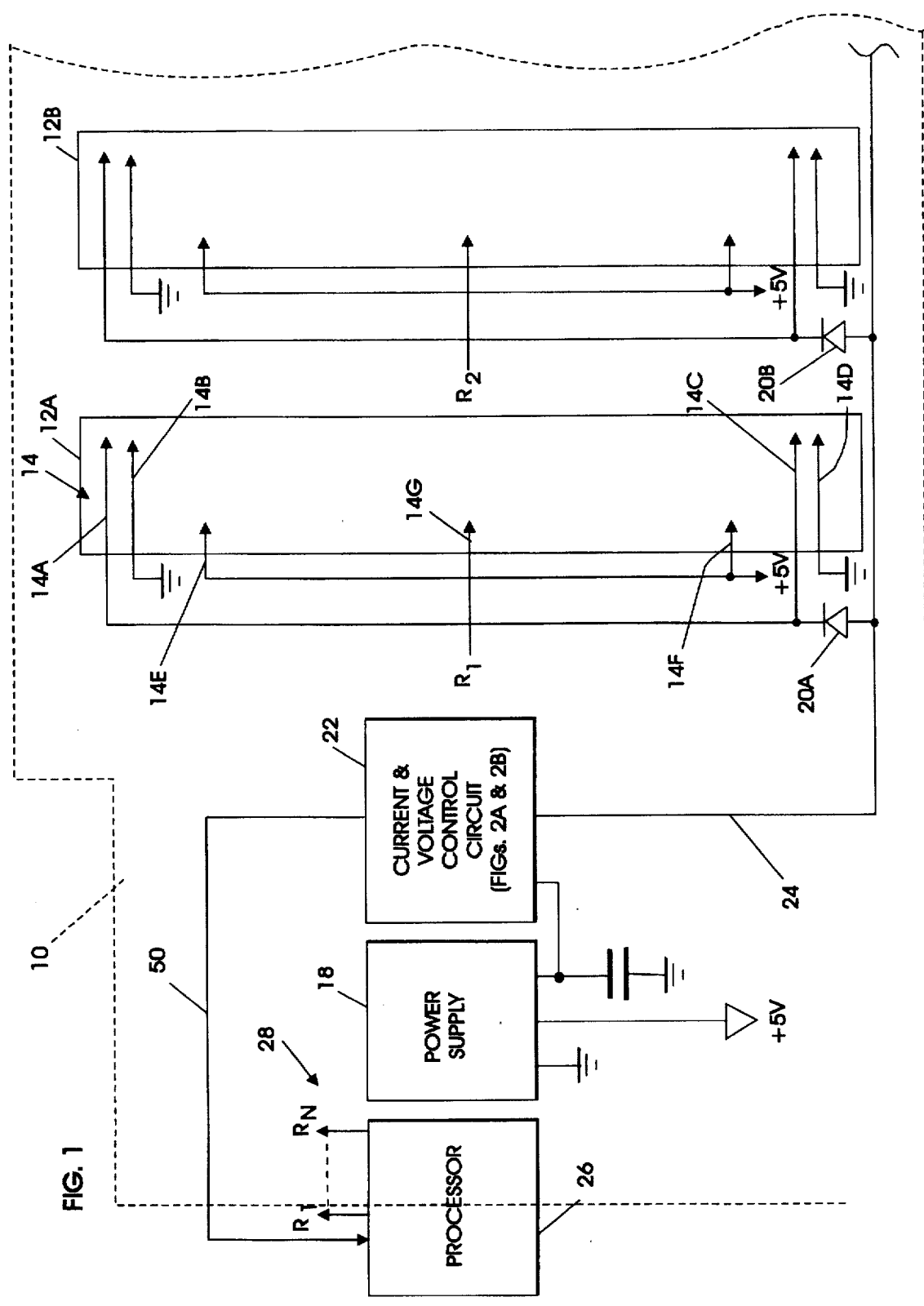
FIG. 1 schematically illustrates the backplane of an electronic system incorporating the present invention, for accepting adapter printed-circuit cards which can be inserted into connectors of the backplane without interrupting the functioning of the electronic system while it is still operating.

Referring now to the accompanying drawings and more particularly to FIG. 1, a motherboard or backplane 10 is illustrated schematically with a plurality of connectors 12—two of which, 12A and 12B, are illustrated in FIG. 1—that would normally be mounted on any such backplane. All of the connectors 12 are preferably identical; therefore, only one such connector, 12A, is described in any degree of detail and even then, only schematically since examples of such connectors are well known in the prior art. Each connector 12 has a plurality of contacts 14, preferably arrayed in rows on each side of a central printed-circuit-card-accepting opening (not shown).

At least five of the contacts, 14A, 14B, 14C, 14D and 14G, of the connector 12A are longer than the rest of the contacts 14. The purpose of the longer contacts is to make contact with a mating contact on the printed-circuit adapter card (not shown) first as the printed-circuit card is inserted into the connector.

Two of the longer contacts, 14B and 14D, located at opposite ends of the connector 12, are interconnected and connected to a ground or common electrical return to a power supply 18 that serves the backplane 10.

Another two of the longer contacts, 14A and 14C, also located at opposite ends of the connector 12A are interconnected and connected to the cathode of an isolation or decoupling diode 20A. Two of the longer contacts (corresponding to 14A and 14C) of preferably all of the other connectors 12 of the backplane 10 are also connected to the cathodes of associated decoupling diodes 20. The anodes of all of the decoupling diodes 20 are connected to the output 24 of a voltage and current control circuit 22 (also FIGS. 2A and 2B) that is associated with the backplane 10 and preferably serves, through the associated decoupling diodes 20, any connector 12 of the backplane 10 that is in the process of accepting a non-operating printed-circuit adapter card.

Two other, shorter contacts 14E and 14F of the connector 12A are connected to the normal voltage (+5 volts DC source) output terminal of the power supply 18. Those shorter contacts 14E and 14F makes electrical connection with their mating contacts of their associated adapter or printed-circuit card later than the longer contacts, as the non-operating printed-circuit card is being plugged into the associated connector 12, for example, connector 12A. For purposes of the present description, the connector 12A will be presumed to be the connector that is in the process of receiving a non-operating printed-circuit card.

Another contact 14G of the connector 12A (for which there is a corresponding contact in each of the other connectors 12 on the backplane 10) is connected to a reset output of a stored-program computer or processor 26 that is either permanently mounted on the backplane 10 or is on an operating printed-circuit card that is already plugged into one of the other connectors 12.

The processor 26 has a plurality of reset outputs 28 that have been labelled $R_1$ through $R_N$. The $R_1$ reset output of the processor 26 is connected to the longer contact 14G of the connector 12A. The rest of the reset outputs $R_2$ through $R_N$ are connected to the corresponding (e.g., 14G) longer contacts of the other connectors 12. Each of the adapter cards or printed-circuit cards that is plugged into or is to be inserted into the connectors 12 can be equipped with a reset circuit that is connected to a contact that will engage the longer contact corresponding to the contact 14G of the connector 12A. Therefore, the processor 26, through its reset outputs 28 has the facility individually and selectively to reset each printed-circuit card that is plugged into a connector 12 on the backplane 10.

When a non-operating but operable adapter card or printed-circuit card (not shown) is inserted into the connector 12A, it initially makes contact with either the contacts 14A and 14B or the contacts 14D and 14C, depending upon which way the card is slanted as it is initially inserted. As soon as the printed-circuit card makes contact with, for example, both of the contacts 14A and 14B, the printed-circuit card appears to be an electrical short circuit between those two contacts. Therefore, zero, ground, or common return voltage is initially put on the cathode of the diode 20A. That zero or ground voltage is therefore applied to the output 24 of the voltage and current control circuit 22.

The Voltage and Current Control Circuit 22

Referring now to FIGS. 2A and 2B, the internal circuit of the voltage and current control circuit 22 is shown schematically in greater detail. Its output 24 is shown connected to the anode of the decoupling diode 20A. The +5 VDC source from the output of the power supply 18 is the main operating voltage and is connected to several nodes where indicated within the control circuit 22. Also, a +15 VDC control voltage source from the output of the power supply 18 is connected to nodes where indicated within the control circuit 22 and also as the positive power supply voltage for several comparator circuits or differential amplifiers used in the control circuit and described below. While +5 VDC and +15 VDC are convenient and have been widely used, so have 3.3 VDC and 12 VDC. The choice of voltage(s) used depends more upon the specific circuit components chosen and the specific circuit design used rather than upon the function of the circuit.

A voltage divider comprising four resistors 30, 32, 34, and 36 is connected between the +5 VDC source and zero or ground voltage to produce three reference voltages VR1, VR2, and VR3. The uses for VR2 and VR3 will be described below. The reference voltage VR1 is very nearly +5 VDC and is connected directly to the positive input terminal of a comparator circuit or differential amplifier 40. The differential amplifier 40 is the focus of a card-insertion detector circuit 42.

The negative input terminal of the differential amplifier 40 is connected through two resistors 44 and 45 to the +5 VDC source, which normally maintains the negative input terminal of the differential amplifier 40 at +5 VDC. However, the positive input terminal of the differential amplifier 40 is held at the somewhat less positive voltage of VR1. Therefore, prior to the insertion of a non-operating printed-circuit card into the connector 12A, the output of the differential amplifier is held at nearly zero or reference ground voltage. The junction of the resistors 44 and 45 is connected to the output 24 of the control circuit 22.

A filter capacitor 47 is connected between the two inputs of the differential amplifier 40 and. The filter capacitor 47, with the resistor 45, comprises a high-frequency filter 48 which serves to reduce the sensitivity of the differential amplifier 40 to spurious, brief voltage spikes that might appear on the output 24. Therefore, narrow negative voltage spikes on the output 24 of the control circuit 22 will not succeed in affecting the state of the differential amplifier 40. Any negative-going voltage transition applied to the output 24 will have to be long compared to the RC time constant of the resistor 45 and the capacitor 47 in order to significantly change the voltage across the capacitor 47 and thus effectively reach the negative input terminal of the differential amplifier 40.

The Differential Amplifier

A differential amplifier or comparator, such as the differential amplifier 40, is a commonly-available, five-terminal integrated-circuit device which has two power terminals (not shown) that are connected to plus and minus voltage sources such as the +15 VDC source and ground. Two signal input terminals are labeled "+" and "−" or positive and negative, respectively. The two input terminals of a differential amplifier customarily have a very high input impedance. The fifth terminal is the amplifier's output. One type of such a differential amplifier is known by the common designation LM-324, which is preferably used in the present circuit.

The differential amplifier used in the present circuit is preferably of the type which can draw its output toward the voltage of either of its power voltage source terminals, on the order of a push-pull amplifier. That is, when its positive input terminal is at a more positive voltage than its negative input terminal, the output of the amplifier is drawn toward the voltage of its positive power voltage source terminal. However, when the negative input terminal of the differential amplifier experiences a more positive voltage than the voltage of its positive input terminal, the output of the amplifier is drawn toward the voltage of its negative power voltage source terminal—here, zero, ground, or common return voltage. Therefore, a pull-up or pull-down resistor is not necessary with such a differential amplifier.

In its normal operation, such a differential amplifier customarily works in its linear range with its two input terminals at nearly the same voltage, and the differential amplifier produces wide voltage swings at its output in response to small changes in the relative voltages between its input terminals. However, it can also operate at extremes of output voltages when there are wide swings of the relative voltages of its input terminals. This latter mode is principally used in the present circuit.

The Cardin Signal

All of the connectors 12, whether or not they are holding operating printed-circuit cards, are receiving +5 VDC at their input contacts corresponding to 14E and 14F. Internally, within each operating printed-circuit card, that received +5 VDC power is connected to the contacts (corresponding to 14A and 14C) of the associated connector 12. Therefore, each decoupling diode 20 of a connector 12 having an operating printed-circuit card has its cathode at +5 VDC. The decoupling diodes 20 of all unpopulated connectors 12 have their cathodes connected to an open circuit. Meanwhile the anodes of all of the decoupling diodes 20 are held at +5 VDC through the resistor 44.

When a non-operating printed-circuit card (not shown) is first inserted into a connector, such as the connector 12A, the printed-circuit on the card appears to be a short circuit or at least a very low impedance between its +5 VDC internal bus and its common return or internal ground bus. Therefore, initially, the non-operating printed-circuit card couples either contact 14A to contact 14B or couples contact 14C to 14D. Consequently, the ground voltage of contact 14B or 14D is applied to the cathode of the associated decoupling diode 20A, forward biasing the diode and dragging its anode to nearly the same ground voltage. Therefore, as soon as a non-operating printed-circuit card makes a connection to both of the contacts 14A and 14B or 14C and 14D, of a connector 12A, the anode of the decoupling diode 20A is no longer at +5 VDC by reason of the effect of the resistor 44 but is at nearly zero or ground voltage.

When the Anode of the decoupling diode 20A is held at nearly ground voltage by the beginning of insertion of a non-operating printed-circuit card into the connector 12A, that ground voltage is also present at the output 24 of the control circuit 22, to which the anodes of all of the decoupling diodes 20 are connected. Since that output 24 is connected to the interconnection node of the diodes 44 and 45 (see the negative-going transition in waveform marked V1, at time $t_1$ on FIG. 3), that node is now also at ground voltage. When that node between the resistors 44 and 45 makes a transition from +5 VDC to nearly ground voltage, the negative input of the differential amplifier also experiences a transition to nearly ground voltage. The transition of the negative input of the differential amplifier 40 from +5 VDC to ground voltage is not instantaneous but occurs in a transition time that is rapid yet dictated by the RC time constant of the resistor 45 and the very small capacitor 47.

As soon as the voltage of the negative input terminal of the differential amplifier 40 becomes more negative than the voltage of the positive input terminal of the differential amplifier, the output of the differential amplifier changes from ground voltage to the voltage of its positive voltage source (not shown, but preferably +15 VDC). This positive-going transition at the output of the differential amplifier 40

(see the waveform labelled CARDIN at time $t_1$. in FIG. 3) occurs when the negative-going voltage of the output 24 approximately equals the reference voltage VR1 that is connected to the positive input terminal of the differential amplifier.

The output of the differential amplifier 40 is connected by a CARDIN conductor 50 (also see FIG. 1) directly to the processor 26. The processor 26 maintains a database map of which of its associated connectors 12 are populated with operating printed-circuit cards and which connectors are not populated. As soon as the processor 26 receives a CARDIN signal on the conductor 50, it knows that a non-operating printed-circuit card is in the process of being inserted into one of its associated, unpopulated connectors 12 of the backplane 10. However, the processor 26 does not know which one of the unpopulated connectors 12 is about to be populated; but the processor 26 does not have to know.

In practice, it is expected that it ordinarily takes between 10 milliseconds (ms) and 50 ms for a printed-circuit card to move from the position where only two or more longer contacts such as 14A, 14B, 14C, 14D, and 14F are connected to the position at which all of the shorter contacts such as 14E and 14F are connected. However, it is possible that if a printed-circuit card is inserted very deliberately or possibly never fully inserted, it may be necessary to terminate the operation of the voltage and current control circuit 22. Therefore, the output of the differential amplifier 40 is also connected directly to a timeout circuit 52, and the positive-going transition of the differential amplifier's output starts the timeout circuit to time a maximum card-insertion duration. The operation of the timeout circuit 52 will be described in greater detail, below.

Reset Signal

As soon as the processor 26 receives a CARDIN signal on the conductor 50, the processor, under program control, sends a reset signal (voltage level) on those of the reset outputs 28 (FIG. 1) associated with all of the connectors 12 that its database map says are not populated with operating printed-circuit cards. The connector 12A is among the connectors 12 that are listed as being unpopulated. Therefore, the reset contact 14G of the connector 12A, that is connected to the reset output $R_1$, receives a reset voltage level signal, continuously, until the processor 26 removes the reset signal.

Preferably, printed-circuit cards are used with the motherboard 10 which are constructed so as always to start operating in a predetermined state and to start only after they have been fully plugged into the motherboard connector 12. However, the printed-circuit cards which use the connectors 12 are alternatively of the type that can be reset and held in the reset condition by receipt of a suitable reset voltage level at one of their connector contacts. That connector contact corresponds to the contact 14G on connector 12A. The reset function internal to such a printed-circuit card holds the printed-circuit card in a specific, initial operating state or condition, from which it begins functioning only when the reset voltage-level signal has been removed. The usage of and removal of the reset signal is described further, below, in connection with completion of the card-insertion process.

Current-Limit Circuit

The cathode of an isolation diode 54 is also connected to the output of the differential amplifier 40. The anode of the isolation diode 40 is connected to the positive input of another comparator or differential amplifier 56. The differential amplifier 56 is the control element of a current-limit circuit 57. The positive input terminal of the differential amplifier 56 is also connected to a resistor 58, the other end of which is connected to a resistor 59 which is connected to the +5 VDC voltage source, in order to bias the positive input of the differential amplifier 56 toward +5 VDC.

Prior to the start of insertion of a printed-circuit card into the connector 12A, the output of the differential 40 is at zero volts or ground voltage or potential. Therefore, the diode 54 is forward biased and keeps its anode, and the positive input of the differential amplifier 56, at nearly zero or ground voltage, against the positive bias of the resistors 58 and 59. Since the negative input of the differential amplifier 56 is normally held at the positive voltage (actually, about +4.5 VDC) of the reference VR3, the output of the differential amplifier 56 is also at zero or ground voltage.

When the output of the differential amplifier 40—and the CARDIN conductor 50—experiences a positive-going voltage transition at the beginning of insertion of a printed-circuit card, the differential amplifier 40 back-biases the isolation diode 54. Without the isolation diode 54 holding the positive input terminal of the differential amplifier 56 at nearly ground voltage or potential, the resistors 58 and 59 are free to draw the positive input terminal of the differential amplifier 56 toward +5 VDC. When the positive input terminal of the differential amplifier 56 becomes more positive than its negative input, the output of the differential amplifier becomes more positive and tries to turn ON a power field-effect-transistor (FET) switch 66.

The Power FET

In order to control the voltage and current supplied to the non-operating printed-circuit while it is being inserted into the connector 12A, the output 24 of the control circuit 22 is connected to the source terminal 67 of the metal-oxide semiconductor field-effect transistor (MOSFET), or simply the power FET 66. The FET 66 is of a high-current type that has a very large number of source areas on its operative surface, all of which are connected in parallel to the source terminal 67 of the FET 66. The drain areas on the operative surface of the FET 66 are all connected in parallel to a common drain terminal 68, which is connected to the node between the resistors 58 and 59.

Power field-effect transistors (FETs) are well known. They are integrated circuits with large numbers of individual FETs manufactured on the operative surface of a single integrated-circuit (IC) die or chip. Since the FETs are all manufactured together, they all have nearly identical characteristics. Their sources are all interconnected, their drains are all interconnected, and their gates are all interconnected. Therefore, all of the FETs on a single integrated circuit function in parallel to form a three-terminal device capable of switching or controlling large amounts of current. A more detailed description of such a power FET can be obtained from Application Note 966A entitled *HEXFET III: A New Generation of Power MOSFETs* by D. Grant, published by International Rectifier Corporation, in the June, 1992 issue of its HEXFET Power MOSFET Designers' Manual (HDM-1, Vol. 1).

A diode illustrated inside of the FET 66 is an internal body diode of the device and is normally back biased at less than its avalanche voltage and takes no part in the normal operation of this circuit.

The common gate terminal 69 of the FET 66 controls the formation and depth of the temporary conductive channels of the FETs of the FET 66 by reason of the magnitude of the gate-to-source voltage.

Returning to the differential amplifier 56 of the current-limit circuit 57, a negative-feedback capacitor 61 is connected between the now positive-going output of the differential amplifier 56 and its negative input terminal. While the output of the differential amplifier 56 is experiencing a positive-going transition, the negative-feedback capacitor 61 tends to drive the negative input terminal more positive and thus counteract and slow the positive-going voltage transition at the output of differential amplifier.

A bleed resistor 62 tries to keep the negative input of the differential amplifier 56 at the reference voltage VR3 by gradually bleeding current from the negative-feedback capacitor 61. The result is that the voltage of the negative input terminal of the differential amplifier 56 tries gradually to sink back down to the voltage of VR3. The RC constant of the resistor 62 and the capacitor 61 determines how strongly the capacitor 61 controls (ie., slows) and limits the positive-going transition of the voltage at the output of the differential amplifier 56. Consequently, the RC time constant of the resistor 62 and the capacitor 61 determines how long it takes for the output of the differential amplifier to transition from ground voltage to the positive voltage of its positive power source (not shown). While negative-feedback capacitor 61 is charging through the bleed resistor 62, the differential amplifier 56 is operating in its linear mode with its two input terminals at very nearly the same voltage.

The output of the differential amplifier 56 is connected through a resistor 64 to the gate 69 of the power FET 66. The source terminal 67 of the FET 66 is connected to the output 24 of the control circuit 22, which changes from +5 VDC to zero or ground voltage as soon as the non-operating printed-circuit card is plugged into the connector 12A. The drain terminal of the FET 66 is connected to the node between the resistors 58 and 59, the voltage of which is depicted in the waveform labelled V2 in FIG. 3.

Figure 3:
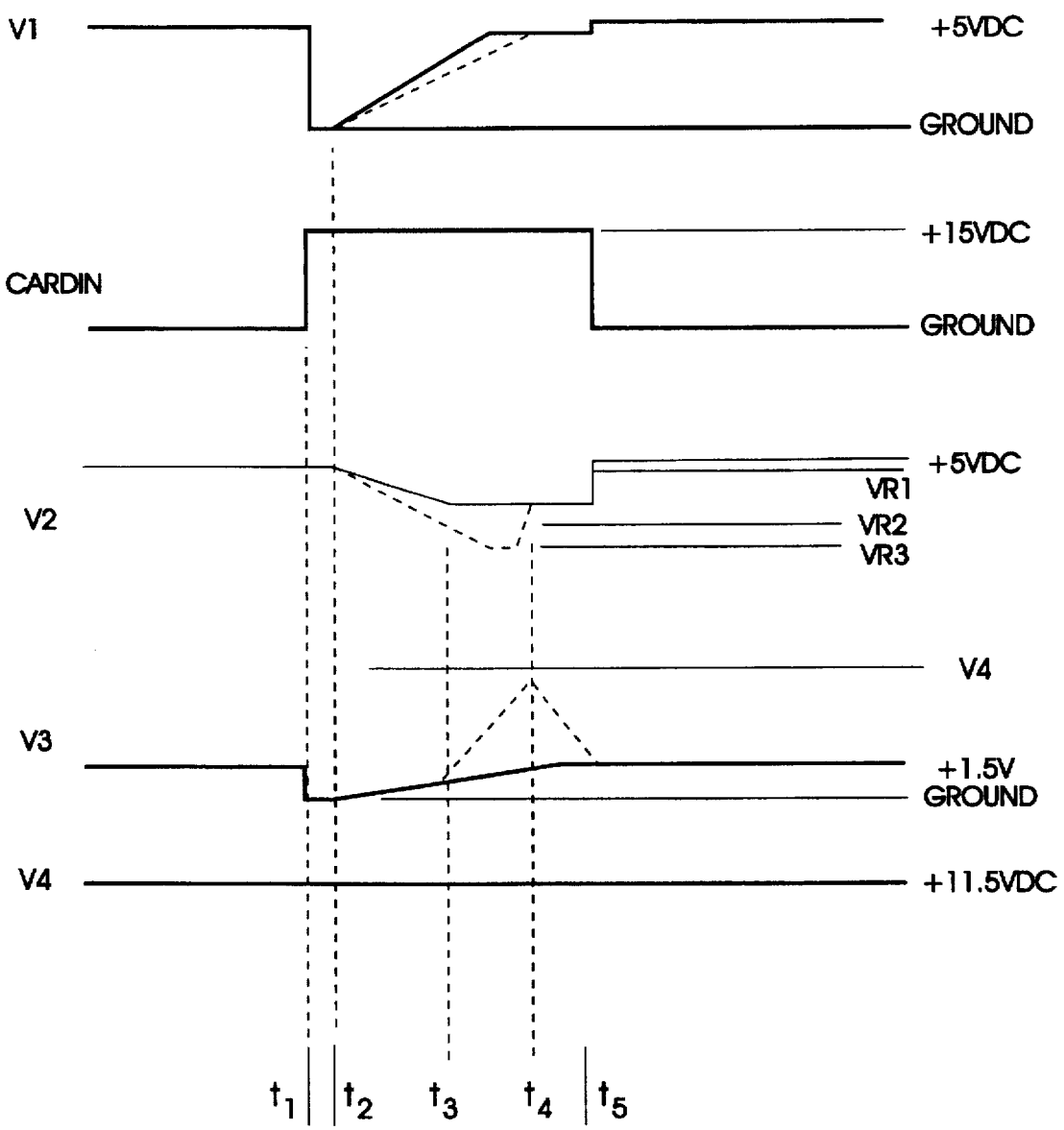
FIG. 3 shows the waveforms that result at selected nodes within the circuit of FIGS. 2A and 2B when a non-operating, but operable printed-circuit card is plugged into one of the connectors of the backplane of FIG. 1.

As the output of the differential amplifier 56 gradually (in terms of milliseconds) assumes a more positive voltage, it finally reaches a sufficiently positive voltage to produce sufficient gate-to-source voltage at the power FET 66 to begin gradually to turn ON the power FET 66 (the time $t_2$ in FIG. 3). Therefore, a short time after the positive-going voltage transition of the CARDIN signal (see FIG. 3) indicates that a non-operating printed-circuit card has been plugged into the previously unpopulated connector 12A, the power FET 66 begins conducting current from the +5 VDC source, through the resistor 59, through the partially-conducting drain-to-source channels within the power FET 66, to the output 24, through the now-forward-biased isolation diode 20A and the long contacts 14A or 14C of the connector 12A to the printed-circuit card that is being inserted into the connector 12A.

The conductivity of the power FET 66 is initially very low because its gate terminal is initially only sufficiently positive to allow very little current conduction across a voltage of 5 VDC. Therefore, the power FET 66 severely limits the initial magnitude of current that can be delivered to the non-operating printed-circuit card that is in the process of being inserted into the connector 12A. Consequently, the initial voltage applied to the longer contact 14A or 14C is also severely limited.

The rise of the current delivered to the printed-circuit card being inserted causes the voltage V1 (see FIG. 3) to begin its ramp-like transition from substantially ground voltage toward the voltage of the +5 VDC source. While linear ramps are shown in the waveforms of FIG. 3, it will be understood by those skilled in the art that the current path through the power FET 66 is actually resistive, and the printed-circuit card being inserted may have capacitors and many other circuit features which would be inconsistent with a linear voltage rise through a resistive circuit.

As the power FET 66 turns ON slowly (again, in terms of milliseconds), it conducts increasing current from the +5 VDC supply,through the very low (preferably, approximately 0.05 ohms) resistance of the resistor 59 to the output 24. As the. resistor 62 gradually bleeds current to charge the capacitor 61, the output of the differential amplifier 56 becomes a more positive voltage and the power FET 66 becomes more conductive as its gate-to-source voltage increases. The power FET 66 conducts more current to the printed-circuit card being inserted into connector 12A (shown as a drop in the waveform V2 that depicts the voltage under the series resistor 59), at an increasing voltage (depicted as a rise in the V1 waveform.

Therefore, as more current is made available through the increasingly-conductive drain-to-source path through the power FET 66, the voltage V2 also ramps down from its initial +5 VDC toward a minimum value. That minimum value of voltage V2 is alternatively determined and depicted in alternative solid and dotted lines in FIG.3.

The first alternative of the minimum value of the voltage V2 is determined by the maximum current that the printed-circuit card being inserted can accept at +5 VDC minus the voltage drop across the resistor 59. In the case of a typical printed-circuit card without a lot of capacitance that has to be charged, it is expected that V2 would reach a minimum voltage in excess of +4.6 VDC, which is the approximate value of VR2 (shown in solid lines in the waveform of V2 in FIG. 3.

The second alternative of the minimum value of the voltage V2 would occur in the case of a printed-circuit card that contains a lot of capacitance that has to be charged to various voltages. This is the alternative of the waveforms V1 and V2—and also V3 that is described below—that are depicted in dotted lines in FIG. 3. The current through the power FET 66 increases faster and the voltage V2 drops faster until it reaches the reference voltage VR3 (about +4.5 VDC). When the voltage V2 drops to VR3, the differential amplifier 56 ceases driving toward a full positive voltage at its output and tends to stabilize its output voltage.

When the differential amplifier 56 stabilizes its output voltage, it causes the power FET 66 to stop or slow the increase of its series conductivity so that it will not conduct any additional current. This is depicted as the lowest point of the dotted-line portion of the V2 waveform.

At some point, the capacitances on the printed-circuit card become sufficiently charged so as to reduce their current demands, and the voltage V2 again begins to rise until it, too reaches (at a time slightly after $t_4$ in FIG. 3) a steady state voltage that equals +5 VDC minus the voltage drop across the resistor 59 and across the source-to-drain path of the power FET 66.

In this way, the maximum current through the current limited circuit can be controlled so as not to draw too much current through the power FET 66.

Timeout Circuit

Some printed-circuit cards draw relatively little current, and some printed-circuit cards draw a high current. If a printed-circuit card is inserted at a sufficiently large angle, it may wedge and jam in mid insertion. The shorter contacts 14E and 14F which carry +5 VDC to the printed-circuit card after it has been fully inserted may not then make contact in order to bypass and thus terminate the operation of the control circuit 22. If the printed-circuit card being inserted draws a high current, it may draw a high current through the power FET 66 for too long a time and risk destruction of the power FET 66.

It is not economically justified to make the power FET 66 capable of handling a high current on a continuous basis (ie., longer than about 50 milliseconds). In any event, such a wedged printed-circuit card will have to be withdrawn before it can be inserted correctly. Therefore, it is desirable to turn OFF the power FET 66 if insertion takes too long.

Therefore, the drain terminal 68 of the power FET 66 is also connected to the negative input terminal of a differential amplifier 71 of the timeout circuit 52. The positive input terminal of that differential amplifier 71 is connected to the voltage reference VR2, which is slightly less positive than the +5 VDC source (about +4.6 VDC). Before the beginning of insertion of the printed-circuit card into the connector 12A, the voltage V2 at the node between the resistors 58 and 59 is at essentially +5 VDC. Consequently, as long as there is no current or at least relatively little current flowing through the resistor 59, the output of the differential amplifier 71 is at essentially the zero voltage level of the ground reference.

Returning now to the CARDIN signal at the output of the differential amplifier 40, the output of the differential amplifier 40 is also connected to a coupling capacitor 70, the other end of which is connected to the gate 75 of a FET 72. A resistor 74 biases the gate 75 of the FET 72 toward ground voltage. Since the source terminal 77 of the FET 72 is also connected to the reference ground, the gate-to-source voltage of the FET 72 is essentially zero, and the FET 72 is non-conductive, at least until a printed-circuit card is inserted or plugged into an unpopulated connector 12, such as the connector 12A.

The drain terminal 79 of the FET 72 is connected through a bias resistor 76 (about 910 Kilohms) to a +15 VDC voltage source at the power supply 18. A timing capacitor 78 is connected between the drain terminal 79 of the FET 72 and ground. The drain terminal 79 is also connected through a divider resistor 81 (about 100 Kilohms) to the output of the differential amplifier 71. Since the output of the differential amplifier 71 is normally held a zero or ground volts until a substantial current flows through the resistor 59, the drain terminal 79 is initially held at a voltage determined by the voltage-divider ratio of the resistances of the resistors 76 and 81 (about +1.5 VDC)—see the lefthand end of the V3 waveform of FIG. 3.

The output of the differential amplifier 40 experiences a positive-going voltage transition (see the waveform CARDIN at time $t_1$ in FIG. 3) at the start of insertion of the printed-circuit card (not shown) into a formerly unpopulated connector 12, such as the connector 12A. That positive-going voltage transition is coupled through the coupling capacitor 70 to the gate terminal 75 of the FET 72. The resulting positive gate voltage turns ON the FET 72, making it strongly conductive.

When the FET 72 turns ON at the positive-going transition of the CARDIN signal, the timing capacitor 78 discharges rapidly through the strongly-conducting FET 72, completely discharging the timing capacitor 78 (see the negative-going transition of the waveform V3 of FIG. 3 at the time $t_1$). The charge on the small coupling capacitor 70 soon leaks off through the resistor 74 and the FET 72 again becomes non-conductive. The timing capacitor 78 then starts to charge through the bias resistor 76.

However, the divider resistor 81 biases the timing capacitor 78 toward the ground voltage at the output of the differential amplifier 71, in opposition to the bias of the resistor 76. Therefore, the rise of voltage across the timing capacitor 78 is very slow indeed (shown as a solid line of gradual positive slope in the waveform V3 in FIG. 3). However, the voltage V2—of the node between the resistors 58 and 59 and at the negative input terminal of the differential amplifier 71—drops with the increasing current flowing through the resistor 59. If the voltage V2 finally drops to a value that is equal to and then slightly less than the reference voltage VR2 (at time $t_3$ in FIG. 3), the output of the differential amplifier 71 changes from zero or ground voltage to the voltage of its positive power source (about +15 VDC).

When the voltage V2 equals or falls below the reference voltage VR2 and the output of the differential amplifier 71 changes to about +15 VDC, both of the resistors 81 and 76 are trying to charge the capacitor 78 (and with it voltage V3) to +15 VDC. Therefore, when the voltage V2 becomes less than the reference voltage VR2, at time $t_3$ in FIG. 3, the voltage V3 starts rising much faster, as depicted in dotted lines in the waveform V3 in FIG. 3. If the voltage V3 ever reaches a pseudo-reference voltage V4 (about 11.5 VDC) the power FET 66 will be turned OFF (as explained in more detail below) so as to discontinue the voltage and current rise in the printed-circuit card being inserted.

However, as described above, when the capacitances within the printed-circuit card being inserted have charged sufficiently, the current through the resistor 59 drops, raising the voltage V2 above the reference voltage VR2 (at time $t_4$ in FIG. 3). At that point, the differential amplifier 71 changes its output voltage from +15 VDC back to zero or ground voltage; and the lower resistance of the resistor 81 starts reducing the charge on the capacitor 78 and drawing the voltage V3 back toward about +1.5 VDC.

At some time later, insertion of the printed-circuit card is completed. At that time (indicated as time $t_5$ in FIG. 3), the shorter +5 VDC power connectors 14E and 14F make contact with their associated contacts on the printed-circuit card, effectively bypassing the longer contacts 14A and 14C. The decoupling diode 20A is no longer forward biased. Therefore, the output 24 (and V1) is free again to assume +5 VDC through the resistor 44. Consequently, the output of the differential amplifier 40 changes back from a high positive voltage to zero or ground voltage (see negative-going transition in the CARDIN waveform of FIG. 3) and the control circuit 22 is ready to accommodate insertion of another non-operating printed-circuit card.

The Reset Function

As mentioned above, while some printed-circuit adapter cards are designed to self-set to a default power-up condition, many program-controlled electronic systems provide a capability of the central processor unit, such as the processor 26, to send a reset signal to any peripheral device or printed-circuit adapter card that may be malfunctioning or only functioning questionably. Such a program-controlled reset command function is represented by the adapter reset outputs 28 of the processor 26 (labelled $R_1$ to $R_N$ in FIG. 1).

When the processor 26 wants an adapter or printed-circuit card to be reset, it sends a reset signal through that adapter card's reset conductor—corresponding to the contact 14G—on the backplane 10. That reset signal is conducted by the connector contact (14G) to the reset conductor or bus on that printed-circuit adapter card, to affect the reset function within the specific printed-circuit adapter card to be reset.

As long as the current control circuit 22 is operating to limit current to the adapter or printed-circuit card being inserted, there is a CARDIN signal being generated and received by the processor 26.

If desired, the processor 26 can monitor the CARDIN signal and generate a reset signal for each unpopulated connector 12, including the connector 12 of the printed-circuit adapter card being inserted (e.g., at the connector 12A). When the CARDIN signal stops, the processor 26 can, under software control, either discontinue the reset signal or continue that reset signal for a slightly extended time. The purpose for extending the reset signal beyond the termination of the CARDIN signal could be to assure that the previously-operating printed circuit adapter cards as well as all portions of the newly-inserted printed-circuit adapter card are fully ready for the newly-inserted printed-circuit adapter card to become operative.

Under the preferred program control of the processor 26, if individual, external reset of newly-inserted printed-circuit cards is desired, as long as there is a CARDIN signal being generated, a reset signal is supplied to that printed-circuit adapter card that is being inserted. Therefore, the printed-circuit adapter card being inserted can not begin to operate until the reset signal has been removed by the processor 26, at or some time after the completion of insertion of the printed-circuit card.

Consequently, preferably only when the adapter or printed-circuit card has been fully inserted into the connector 12A and the current limiting circuit 57 is no longer limiting the application of current and voltage to the newly-inserted printed-circuit adapter card, will the reset signal be removed by the processor 26 so as to allow the printed-circuit adapter card to become operative. Also, at that point, because the reset signal has reset the newly-inserted adapter card to a specific, known internal state, a newly-inserted adapter card will always become operative in the desired internal state whenever it is inserted into an operating system. The processor 26 is programmed to recognize the effect of operation of the newly-operating printed-circuit card and update its database map of its connectors 12.

While the form of apparatus herein described constitutes a preferred embodiment of this invention, it is to be understood that the invention is not limited to this precise form of apparatus, and that changes may be made therein without departing from the scope of the invention which is defined in the appended claims.

We claim:

1. A backplane for accommodating a plurality of printed circuit-cards in a plurality of connectors mounted on the backplane, a hot-plugging circuit associated with the backplane and common to all the connectors thereof to control the voltage and current supplied to a non-operating printed-circuit card as it is being inserted into one of the connectors of the backplane while the other printed-circuit cards that are already plugged into connectors on the backplane are operating, said hot-plugging circuit characterized by:

transition contact means on each connector for making electrical connection between selected card-edge contacts on a non-operating printed-circuit card and selected mating card-edge contacts on said connector prior to making connection between all other card-edge contacts on said connector and the mating card edge contacts of the non-operating printed-circuit card being inserted, irrespective of how the printed-circuit card is inserted into said connector;

current transition means for temporarily applying a limited voltage and current to the transition contact means of a printed-circuit card being inserted into a backplane connector;

transition signalling means responsive to the current transition means for generating a signal signifying that the current transition means is supplying a limited voltage and current to a printed circuit card that is being inserted into the operating system;

timing means responsive to the transition signalling means for extending the time that a printed circuit card being inserted is retained in a non-operative state following full insertion; and, means responsive to the timing means for bypassing the current transition means.

2. A backplane according to claim 1, wherein the means for extending the time that the circuitry of the printed-circuit card is held in the predetermined state is under program control.

3. A transient current controlling circuit for applying voltage and current from a power source at a controlled rate to a non-operating printed circuit card, having card edge contacts, while being inserted into a vacant one of a plurality of printed circuit card connectors each having card edge contacts for engaging the card edge contacts of a printed circuit card when inserted in a said connector, connected to circuits contained in a backplane of an operating electronic system comprising:

transition contact means on each connector for making an electrical connection between selected card edge contacts on a printed circuit card and selected card edge contacts on said connector prior to making connection between all other card edge contacts on said connector and the mating card edge contacts of the non-operating printed circuit card being inserted, irrespective of how the printed circuit card is inserted into the connector;

current transition means for temporarily applying a limited voltage and current to the transition contact means associated with a non-operating printed circuit card being inserted into its associated connector;

transition signalling means responsive to the current transition means for providing a signal during the insertion process of a non-operating printed circuit card;

timing means responsive to the signal from the transition signalling means for extending the duration of the signal provided by the transition signalling means; and, means responsive to the timing means for bypassing the current transition means.

4. A transient-current-controlling circuit according to claim 3 wherein the means for extending the time that the circuitry of the printed-circuit card is held in the predetermined state is under program control.

5. A transient current controlling circuit for applying voltage and current from a power source at a controlled rate to a non-operating printed circuit card, having card edge contacts, while being inserted into a vacant one of a plurality of printed circuit card connectors having card edge contacts for engaging the card edge contacts of a printed circuit card when inserted in a said connector, connected to circuits contained in a backplane of an operating electronic system comprising:

transition contact means on each connector including two interconnected card edge contacts, both longer than a majority of the card edge contacts for making an electrical connection between selected card edge contacts located proximate opposite ends of the printed circuit card before contact is made with the majority of contacts of a non-operating printed circuit card being inserted into the connector;

current transition means for temporarily applying a limited voltage and current through the transition contact means to the printed circuit card being inserted into a connector;

decoupling means including a diode connected between the interconnected long card edge contacts of each connector and the current transition means, said diode being polarized so as to change a quiescent state of an active electronic component in the current transition means upon initiation of insertion of a non-operating printed circuit card into a connector for isolating the printed circuit card being inserted from all inserted operating printed circuit cards;

transition signaling means responsive to the current transition means for generating a signal signifying that the current transition means is supplying a limited voltage and current to a printed circuit card that is being inserted into the operating system;

timing means responsive to the transition signaling means for extending the time that a printed circuit card being inserted is retained in a non-operating state following full insertion; and, current transition means for temporarily applying a limited voltage and current through the transition contact means to the printed circuit card being inserted into a connector; and, means responsive to the timing means for bypassing the current transition means.

\* \* \* \* \*